United States Patent
Rao et al.

(10) Patent No.: US 12,554,747 B2
(45) Date of Patent: Feb. 17, 2026

(54) STATISTICAL K-MEANS CLUSTERING

(71) Applicant: International Business Machines Corporation, Armonk, NY (US)

(72) Inventors: Rahul M Rao, Bangalore (IN); Naiju Karim Abdul, Babusapalaya (IN); Anay K Desai, Bengaluru (IN); Suriya T Skariah, Kochi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/460,546

(22) Filed: Aug. 30, 2021

(65) Prior Publication Data
US 2023/0069079 A1    Mar. 2, 2023

(51) Int. Cl.
*G06F 16/28* (2019.01)

(52) U.S. Cl.
CPC .................. *G06F 16/285* (2019.01)

(58) Field of Classification Search
CPC ..................................... G06F 16/285
See application file for complete search history.

(56) References Cited

U.S. PATENT DOCUMENTS

| | | | |
|---|---|---|---|
| 5,933,818 A * | 8/1999 | Kasravi | G06N 3/126 706/45 |
| 9,317,641 B2 | 4/2016 | Chowdhury et al. | |
| 10,276,575 B2 | 4/2019 | Walke et al. | |
| 10,422,882 B1 * | 9/2019 | Wang | G06F 17/18 |
| 2011/0075917 A1 * | 3/2011 | Cerosaletti | G06T 7/0002 382/165 |
| 2012/0173527 A1 | 7/2012 | Thiesson | |

FOREIGN PATENT DOCUMENTS

| | | | | |
|---|---|---|---|---|
| CN | 1799039 A | * | 7/2006 | ......... G06F 13/4234 |
| WO | 2015109781 A1 | | 7/2015 | |

OTHER PUBLICATIONS

Maarten Loffler, "Shape Fitting on Point Sets with Probability Distributions", https://arxiv.org/pdf/0812.2967.pdf (Year: 2018).*
David M. Hyman, "Statistical theory of probabilistic hazard maps: a probability distribution for the hazard boundary location", National Hazards and Earth System Sciences, pp. 1347-1348 (Year: 2019).*
Mathisfun, "Confidence Intervals", https://web.archive.org/web/20170718031716/https://www.mathsisfun.com/data/confidence-interval.html (Year: 2017).*

(Continued)

*Primary Examiner* — Khanh B Pham
*Assistant Examiner* — Brooks T Hale
(74) *Attorney, Agent, or Firm* — Gavin Giraud

(57) ABSTRACT

In a computer-implemented method for improving a k-means clustering algorithm, a processor modifies a first data point of a data set to include a first distribution boundary. A processor calculates a first effective distance between the first distribution boundary and a first centroid of a cluster. A processor assigns the first data point to the first cluster. A processor recomputes the first centroid based on the first data point and the first distribution boundary.

20 Claims, 10 Drawing Sheets

(56) References Cited

OTHER PUBLICATIONS

Mamoun T. Mardini, "Using Smartwatches to Assess the Temporal Relationship between Ecological Pain and Life-Space Mobility in Older Adults", JMIR Publications, https://s3.ca-central-1.amazonaws.com/assets.jmir.org/assets/preprint, p. 9-11 (Year: 2020).*
Chau, M., "Uncertain Data Mining: An Example in Clustering Location Data", Springer, https://link.springer.com/chapter/10.1007/11731139_24 (Year: 2006).*
Amin, "Gaussian Mixture Model", medium.com, https://medium.com/@yara.ahmed.amin/gaussian-mixture-model-4c71342b67d3 (Year: 2020).*
Chuan-Ming Liu, Zhendong Niu, Kuan-Teng Liao, "Mechanisms to improve clustering uncertain data with UKmeans", Data & Knowledge Engineering, vol. 116, (Year: 2018).*
Gullo, F., Ponti, G., Tagarelli, A. (2008). Clustering Uncertain Data Via K-Medoids. In: Greco, S., Lukasiewicz, T. (eds) Scalable Uncertainty Management. SUM 2008. Lecture Notes in Computer Science( ), vol. 5291. Springer, Berlin, Heidelberg. https://doi.org/10.1007/978-3-540-87993-0_19 (Year: 2008).*
"Enhancing Similarity-Based Value-To-Column Classification by Dynamically Choosing Number of Clusters for Each Column", An IP.com Prior Art Database Technical Disclosure, IP.com No. IPCOM000260804D, Dec. 23, 2019, 3 pages.
"Method and System for Utilizing an Expectation Maximization Algorithm for Clustering Rows of a Matrix for TrueNorth Implementation", An IP.com Prior Art Database Technical Disclosure, IP.com No. IPCOM000236882D, May 21, 2014, 6 pages.
Carrasco, Oscar Contreras, "Gaussian Mixture Models Explained", Towards Data Science, Jun. 3, 2019, 16 pages, <https://towardsdatascience.com/gaussian-mixture-models-explained-6986aaf5a95>.

\* cited by examiner

STATISTICAL K-MEANS CLUSTERING

BACKGROUND

The present invention relates generally to the field of data clustering, and more particularly to modifying the metrics for k-means clustering.

Clustering can be defined as a task of identifying subgroups in a data set such that data points in the same subgroup (cluster) are similar while data points in different clusters are different. The clusters are identified using an unsupervised learning method in which an algorithm draws inferences from data sets without labelled output variables. Thus, clustering may be used to analyze multivariate data sets. The clusters are not grouped based on any criteria other than minimizing the distance between the data points within the clusters.

Characteristics of clusters within a data set depend on the type of algorithm used to create the clusters. For example k-means clustering is a method of vector quantization that partitions data points into clusters by iteratively assigning each datapoint to the cluster with the nearest cluster centroid. The centroid is also iteratively updated by taking the mean of the data points in the cluster. The iterations continue until the centroid(s) fails to move.

SUMMARY

According to one embodiment of the present invention, a computer-implemented method, a computer program product, and a computer system are provided for clustering data points in a cluster. A processor modifies a first data point of a data set to include a first distribution boundary. A processor calculates a first effective distance between the first distribution boundary and a first centroid of a cluster. A processor assigns the first data point to the first cluster. A processor recomputes the first centroid based on the first data point and the first distribution boundary.

DETAILED DESCRIPTION

The disclosed embodiments include an approach for improving a k-means clustering problem in which the data points include values with modified ranges. For example, the datapoint may include a statistical scope or probability in which there is an inherent flexibility to the values of the data points. That is, the datapoint may include at least one variable that is a range rather than a single value: the variable may include a distribution boundary (e.g., sphere or a gaussian distribution) around the captured value of the datapoint. Taking this flexibility into account improves the functioning of the machine running the clustering algorithm by shortening the time and reducing the energy resources used in completing the algorithm.

Figure 1:
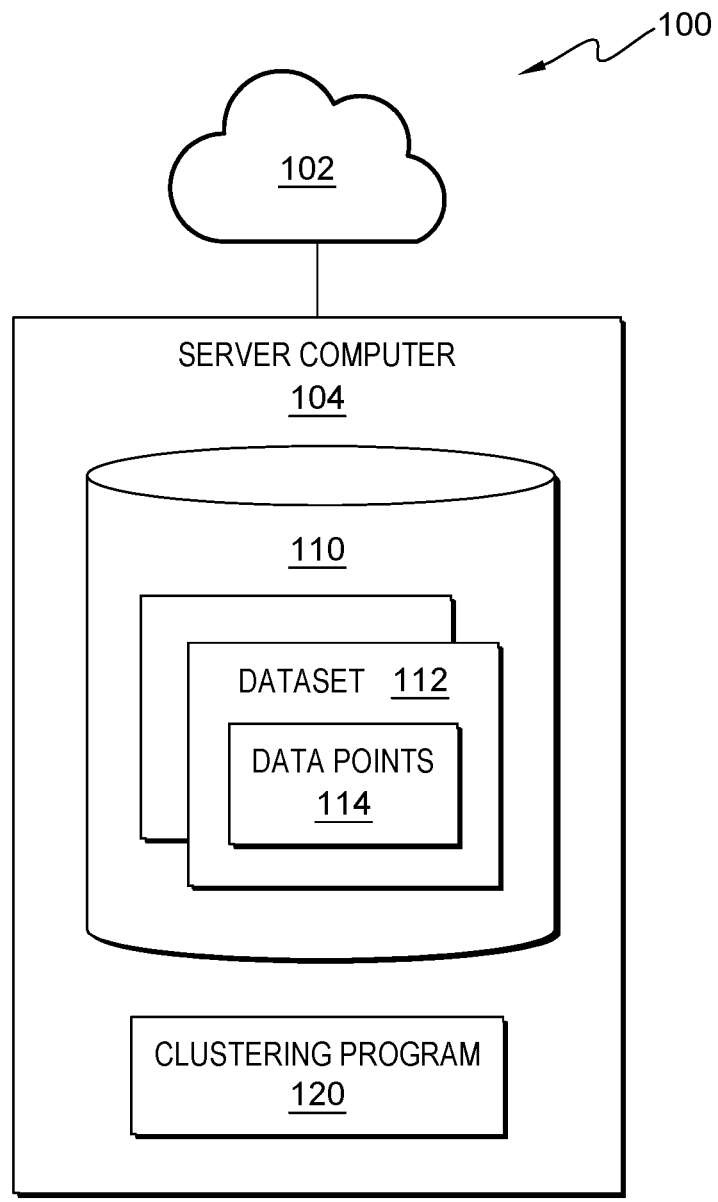
FIG. 1 is a functional block diagram illustrating a clustering environment, in accordance with an embodiment of the present invention.

FIG. 1 depicts a functional block diagram illustrating a clustering environment 100, in accordance with one embodiment of the present invention. FIG. 1 provides only an illustration of one implementation and does not imply any limitations regarding the environments in which different embodiments may be implemented. Many modifications to the depicted environment may be made by those skilled in the art without departing from the scope of the invention as recited by the claims.

The clustering environment 100 includes a server computer 104 connected over a network 102. The network 102 can be, for example, a telecommunications network, a local area network (LAN), a wide area network (WAN), such as the Internet, or a combination of the three, and can include wired, wireless, or fiber optic connections. The network 102 can include one or more wired and/or wireless networks that are capable of receiving and transmitting data, voice, and/or video signals, including multimedia signals that include voice, data, and video information. In general, the network 102 can be any combination of connections and protocols that will support communications between the server computer 104, and other computing devices (not shown) within the computational environment 100. In various embodiments, the network 102 operates locally via wired, wireless, or optical connections and can be any combination of connections and protocols (e.g., personal area network (PAN), near field communication (NFC), laser, infrared, ultrasonic, etc.).

The server computer 104 can be a standalone computing device, a management server, a web server, a mobile computing device, or any other electronic device or computing system capable of receiving, sending, and processing data. In other embodiments, the server computer 104 can represent a server computing system utilizing multiple computers as a server system, such as in a cloud computing environment. In another embodiment, the server computer 104 can be a laptop computer, a tablet computer, a netbook computer, a personal computer (PC), a desktop computer, a personal digital assistant (PDA), a smart phone, or any programmable electronic device capable of communicating with other computing devices (not shown) within the clustering environment 100 via the network 102. In another embodiment, the server computer 104 represents a computing system utilizing connected computers and components (e.g., database server computers, application server computers, etc.) that act as a single pool of seamless resources when accessed within the computational environment 100. In the depicted embodiment, the server computer 104 includes a corpus 110 containing one or more data sets 112 with data points 114 and a clustering program 120. In other embodiments, the server computer 104 may contain other applications, databases, programs, etc. which have not been depicted in the clustering environment 100. The server computer 104 may include internal and external hardware components, as depicted and described in further detail with respect to FIG. 10.

The corpus 110 is a repository for data used by the clustering program 120. In the depicted embodiment, the corpus 110 resides on the server computer 104. In another embodiment, the corpus 110 may reside elsewhere within the clustering environment 100, provided the clustering program 120 has access to the corpus 110. The corpus 110 can be implemented with any type of storage device capable of storing data and configuration files that can be accessed and utilized by the clustering program 120, such as a database server, a hard disk drive, or a flash memory. In an embodiment, the corpus 110 stores a data stream used by the clustering program 120, such as physical local clock buffers (LCBs), sets of training data, data structures, and/or variables used to fit the parameters of a specified model. The data stream may include pairs of input vectors with associated output vectors. The corpus 110 may more generally contain one or more sets of one or more instances of unclassified data.

The clustering program 120 is a program for clustering data into groups or clusters. In the depicted embodiment, the clustering program 120 is a standalone software program. In another embodiment, the functionality of the clustering program 120, or any combination programs thereof, may be integrated into a single software program. In some embodiments, the clustering program 120 may be located on separate computing devices (not depicted) but can still communicate over the network 102. In various embodiments, client versions of the clustering program 120 may reside on any other computing device (not depicted) within the computational environment 100. The clustering program 120 is depicted and described in further detail with respect to FIG. 2.

Figure 2:
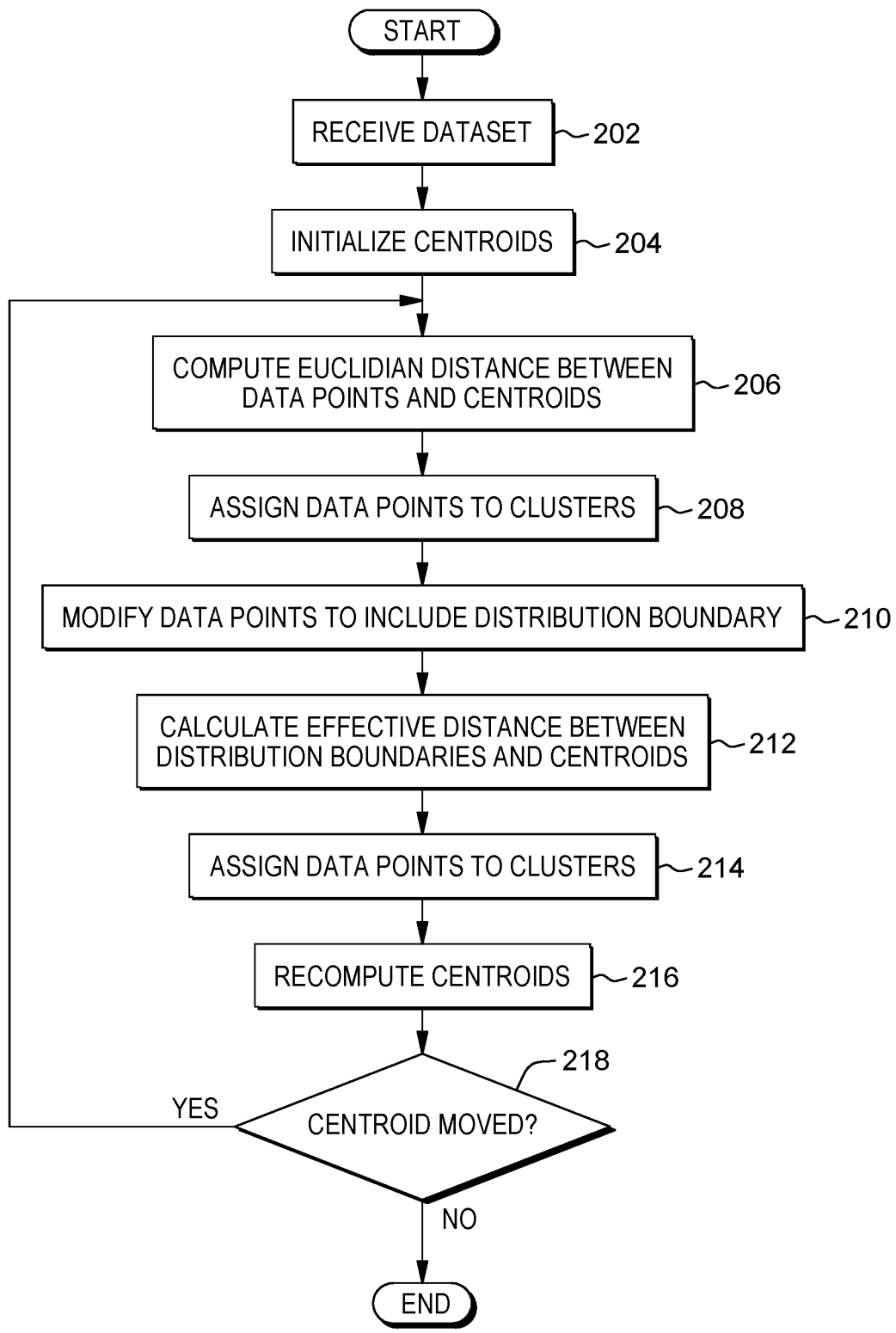
FIG. 2 is a flowchart depicting operational steps of a clustering program, in accordance with an embodiment of the present invention.

FIG. 2 depicts operational procedures of the clustering program 120 of FIG. 1, in accordance with an embodiment of the present invention. The clustering program 120 receives a data set having a plurality of values or vectors (e.g., combinations of values, magnitudes, etc.) (block 202). The data set may include a variety of types of data from different sources and capturing techniques. The data may be captured in real time and updated with additional data points over time.

Figure 3:
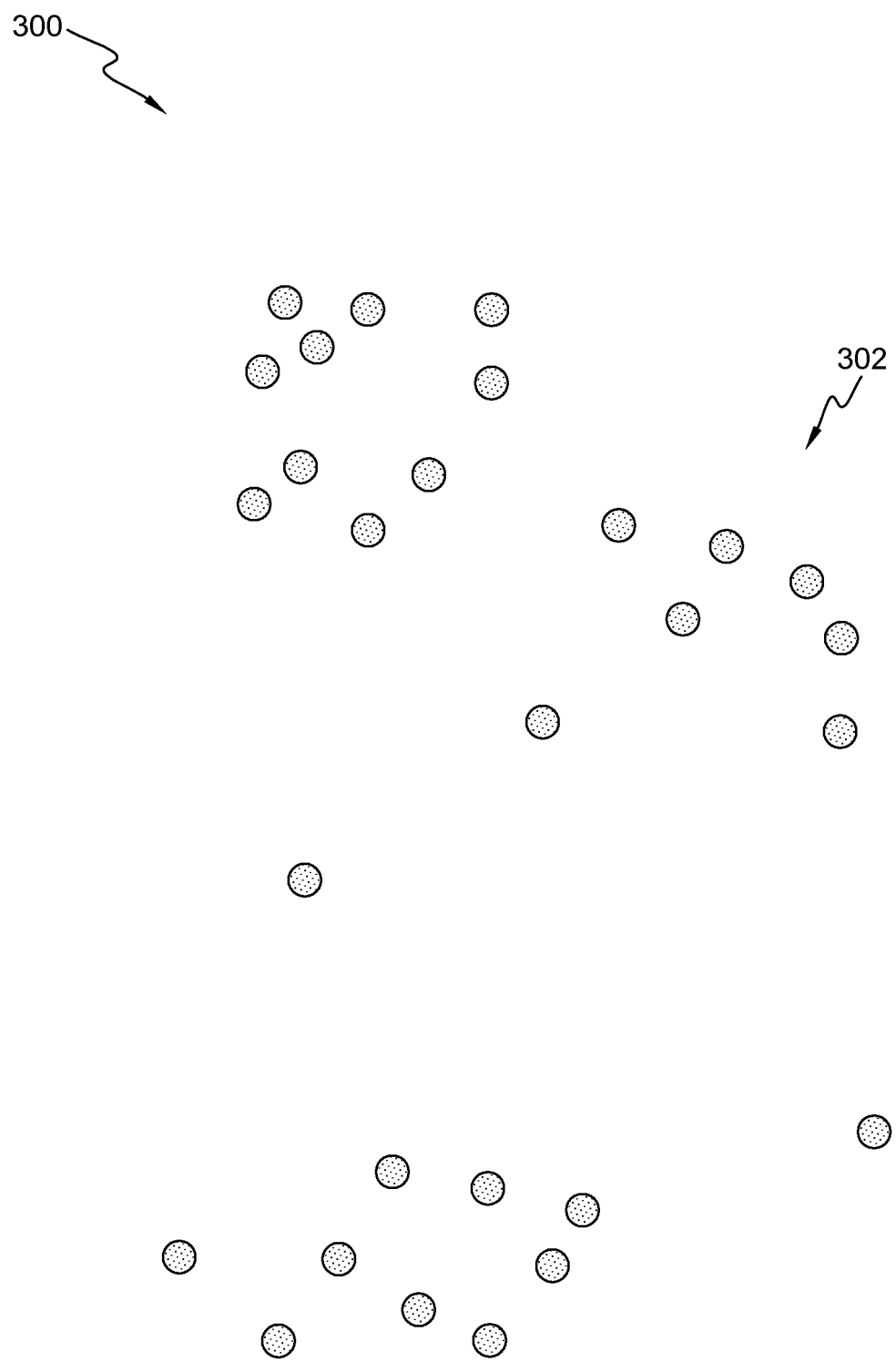
FIGS. 3-9 are diagrams depicting a data set at various stages of operation of the clustering program.

FIG. 3 depicts a two-dimensional representation of a data set 300, in accordance with an embodiment of the present invention. The data set 300 is represented in two dimensions, but the disclosed embodiments of the invention would work for data sets having any number of dimensions and/or variables. The data set 300 has data points 302 (i.e., values or vectors) representing each of the values, points, vectors, etc. received by the clustering program 120.

Figure 4:
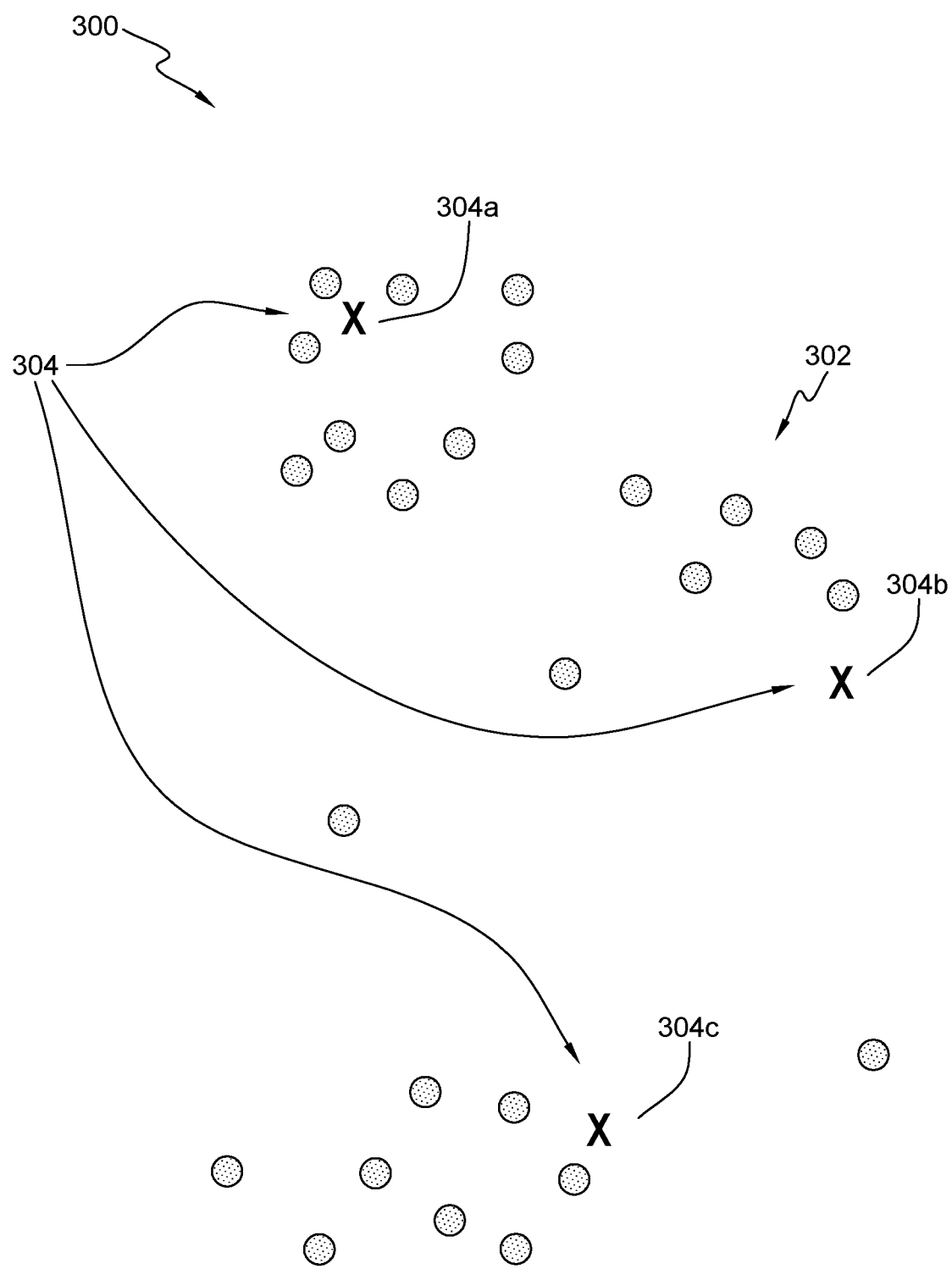

Returning to FIG. 2, the clustering program 120 initializes centroids within the data set. The centroids are typically an average of data points in a cluster. Since the clusters are unassigned, however, the centroids are initialized as a selection of datapoints from the data set 300. FIG. 4 depicts a two-dimensional representation of the data set 300 with centroids 304, in accordance with an embodiment of the present invention. The data set 300 shows the centroids 304 initialized within the data set 300. The centroids 304 may be initialized using a number of techniques.

For example, the centroids 304 may be randomly assigned. To assign the centroids 304, a number of desired clusters is selected (typically designated as "k" clusters), then k random data points 302 are selected from the data set 300 and used as the initial centroids 304. A random selection of data points 302 does not always produce a most useful group of clusters, but can be the easiest and least resource intensive method for initializing the centroids 304. The centroids 304 may also be initialized by selecting a first centroid 304a at a randomly selected data point 302, and then choosing subsequent centroids (e.g., a second centroid 304b and a third centroid 304c) from the remaining data points 302 based on a distance away from the data points 302 nearest existing centroid 304. The centroids 304 end up as far apart as possible. Initializing the centroids 304 may also depend on calculating composite summation values and using the composite summation values to sort the instances of the data set. Other methods may also be used to initialize the centroids 304.

Figure 5:
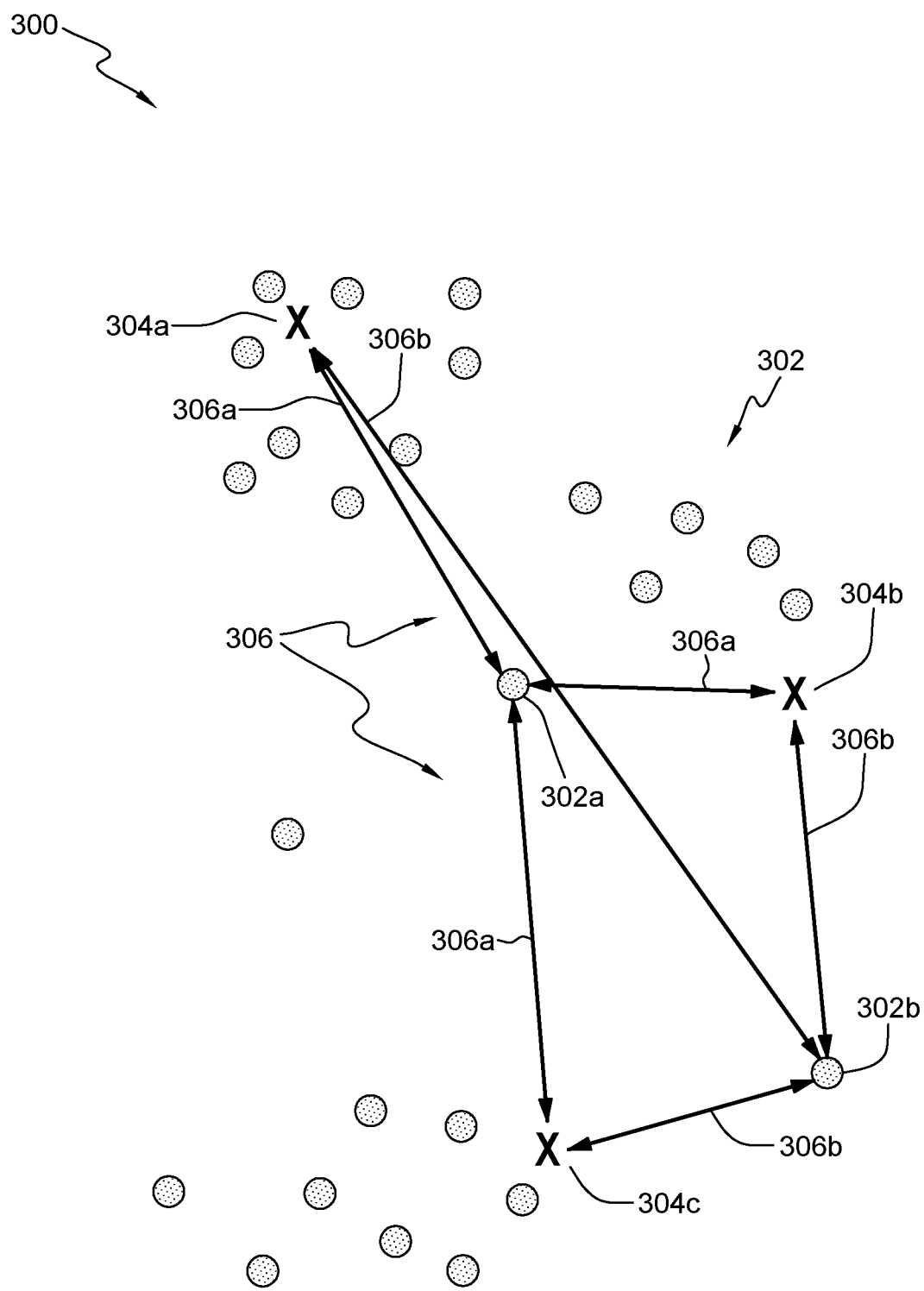

Once the centroids 304 are initialized, the clustering program 120 computes Euclidian distance 306 (i.e., distance between two points) between the data points 302 and the centroids 304 (block 206). FIG. 5 depicts a two-dimensional representation of the data set 300 of FIG. 3 with example Euclidian distances 306 for representative centroids (i.e., the first centroid 304a, the second centroid 304b, and the third centroid 304c). The first centroid 304a has a first Euclidian distance 306a computed for a first datapoint 302a, and a second Euclidian distance 306b computed for a second datapoint 302b. Likewise, the second centroid 304b has a first Euclidian distance 306a computed for the first datapoint 302a, and a second Euclidian distance 306b computed for the second datapoint 302b. The third centroid 304c also has a first Euclidian distance 306a computed for the first datapoint 302a, and a second Euclidian distance 306b computed for the second datapoint 302b. While not illustrated, the clustering program 120 will compute third, fourth, fifth, etc. Euclidian distances 306 for the first datapoint 302a, the second data point 302b, and the remainder of the data points 302.

Figure 6:
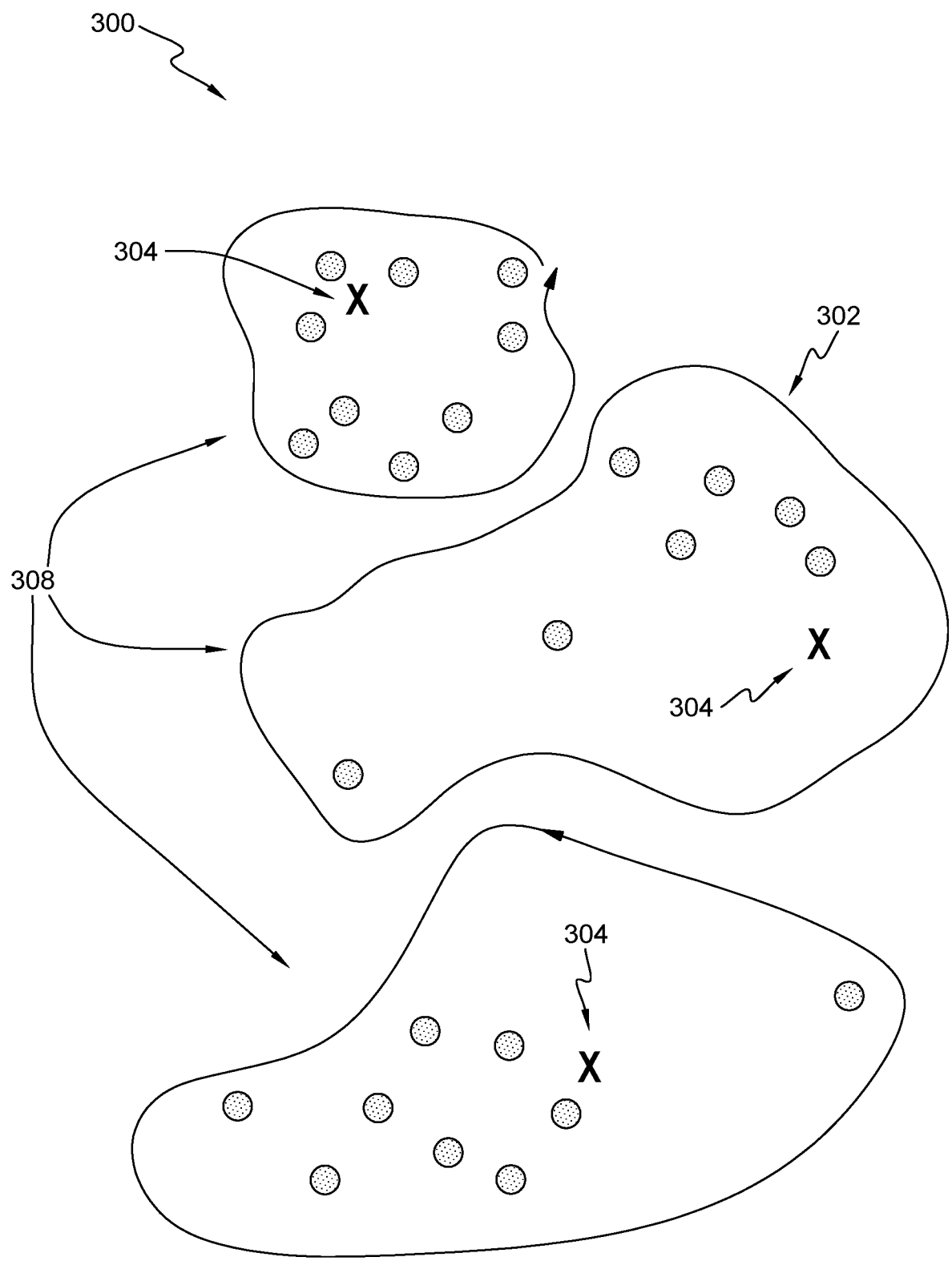

The clustering program 120 may also assign the data points 302 to clusters based on the computed Euclidian distances 306 (block 208). FIG. 6 depicts a two-dimensional representation of the data set 300 of FIG. 3 with assigned clusters 308 included for representative data points 302. The clusters 308 may have the data points 302 assigned based on the distance to the centroids 304. For example, the first datapoint 302a has a Euclidian distance 306 for each centroid 304 (i.e., first Euclidian distance 306a, second Euclidian distance 306b, and third Euclidian distance 306c), and the clustering program 120 assigns the first datapoint 302a to the cluster 308 with the centroid 304 having the shortest Euclidian distance 306. Other restrictions may also be imposed on the algorithm of the clustering program 120.

In certain embodiments, the clustering program 120 may cluster the data points 302 with a maximum number of data points 302 per cluster 308 (i.e., a cluster capacity). For example, the clustering program 120 may include instructions for clustering latches on a logical domain into physical logical clock buffers (LCBs). The LCBs may be subject to electrical constraints based on the physical characteristics of the components running the clock buffer. That is, a given LCB cannot drive more than a specific number of latches, so the clustering program 120 is constrained to minimize the number of LCBs to minimize the congestion and power consumption of the logical domain. In the illustrated embodiment of FIG. 6, therefore, the clustering program 120 may limit the clusters 308 to ten data points 302. Larger clusters 308 and data sets 300 may be assigned by the clustering program 120 without departing from the disclosed embodiments of the present description.

Figure 7:
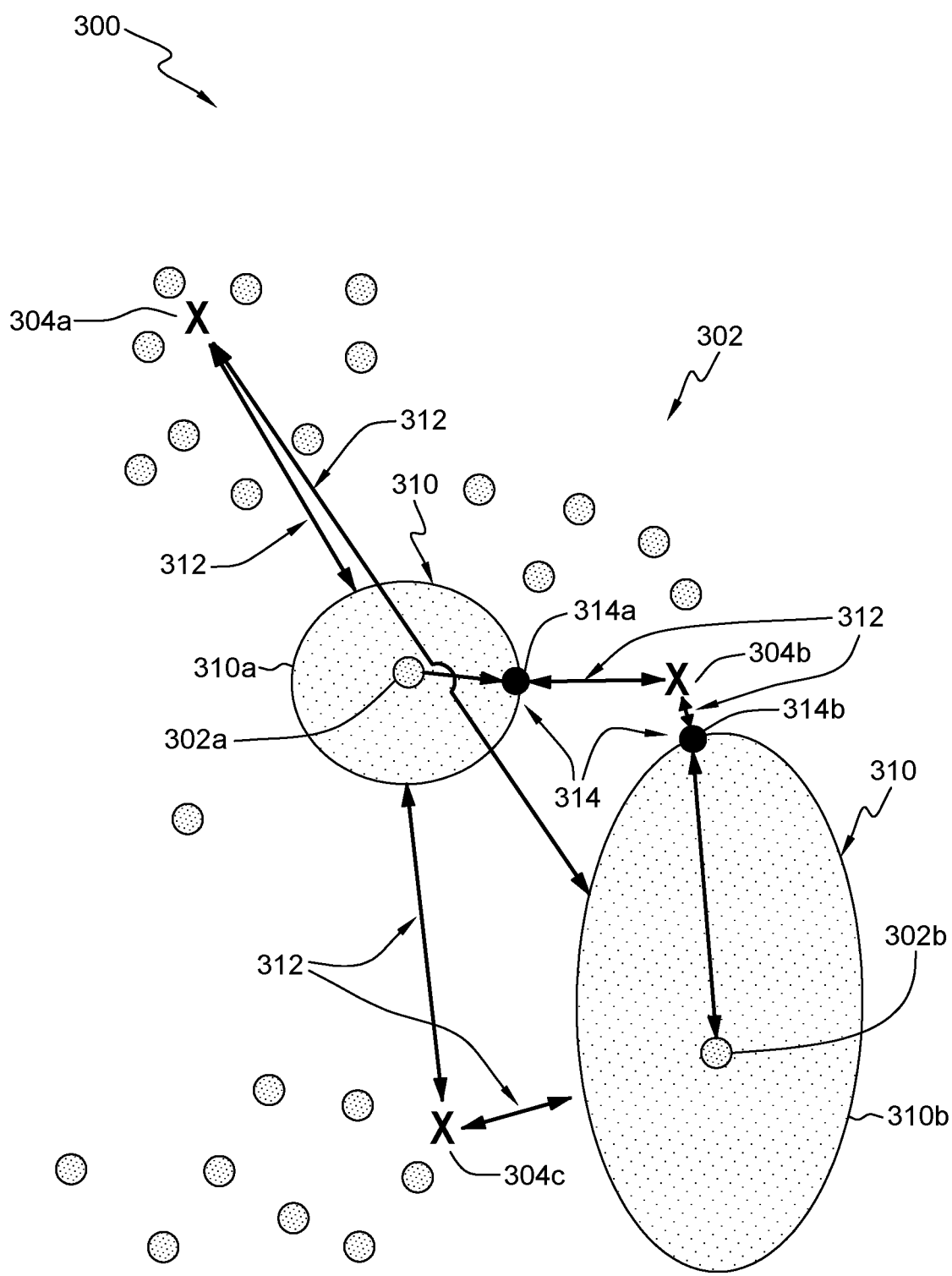

In certain embodiments, tolerances may also be recognized when assigning the data points 302 to the clusters 308. Specifically, the clustering program 120 may modify the data points 302 to include a distribution boundary (i.e., the boundary around the data points 302 at which a distribution of values falls below a threshold) (block 210). FIG. 7 depicts a two-dimensional representation of the data set 300 of FIG. 3 with distribution boundaries 310 included for representative data points 302. The distribution boundaries 310 surround the data points 302 and embody a space (i.e., an area in two-dimensional FIG. 7, a volume for three-dimensional spaces, etc.) in which the datapoint 302 may exist without changing the overall representation of the datapoint 302. For example, the data set 300 may capture data points 302 at one particular value, but the clustering program 120 recognizes that other values will satisfy the conditions for clustering. Therefore, the clustering program 120 modifies the distribution boundary 310 according to all potential satisfactory conditions. As mentioned above, the data set 300 may include data points 302 for hardware components such that the distribution boundaries 310 may represent a physical characteristic. For example, the datapoint 302 may include data from a latch, and the clustering program 120 modifies the distribution boundary 310 with a radius of w*p: w being a pre-defined timing cost per micron of distance (e.g., ps/micron, technology specific) metric, and p being the timing slack of the latch. Additionally or alternatively, the distribution boundary 310 may represent geographical preferences. For example, the geographical preferences may include directional constraints based on physical blockages.

The distribution boundaries 310 may represent ranges for one or more of the variables/values of each datapoint 302. While difficult to represent as a figure, the distribution boundary 310 may be determined as a surface at which the distribution of the data point 302 falls below a threshold value. In the illustrated embodiment of FIG. 7, the x and y variables have dependent ranges, resulting in a circular or elliptical distribution boundary 310. In other embodiments, the distribution boundary 310 may include a rectangular or other shape of distribution boundary 310, in which some range of x values and/or some range of y values are representative of the datapoint 302. The distribution boundary 310 may also include a spherical distribution boundary and a gaussian distribution boundary. The clustering program 120 may also modify a data point 302 that includes a higher number of variables, and the distribution boundary 310 may include dependencies on all, or a subset, of the total variables.

The clustering program 120 may also calculate an effective distance between the distribution boundaries and the centroids (block 212). The effective distance may be calculated using a variety of mathematical relationships. That is, the clustering program 120 calculates the effective distance using the Euclidian distance between the centroids and a recomputing point. As illustrated in FIG. 7, a recomputing point 314 may be located on the exterior of the distribution boundary 310. That is, the effective distances 312 of the first data point 302a may be calculated as a shortest distance between the centroids 304 (i.e., first centroid 304a, second centroid 304b, and third centroid 304c) and a first recomputing point 314a on the exterior of the first distribution boundary 310a; and between the centroids 304 (i.e., first centroid 304a, second centroid 304b, and third centroid 304c) and a second recomputing point 314b on the exterior of the second distribution boundary 310b. In certain embodiments, the clustering program 120 may calculate the effective distance 312 using a different recomputing point 314. For example, the recomputing point 314 may be determined as a furthest point on the distribution boundary 310, an average of values inside the distribution boundary 310, a maximum or minimum value for one variable (e.g., a highest/lowest x value or highest/lowest y value), or other mathematical relationship.

Figure 8:
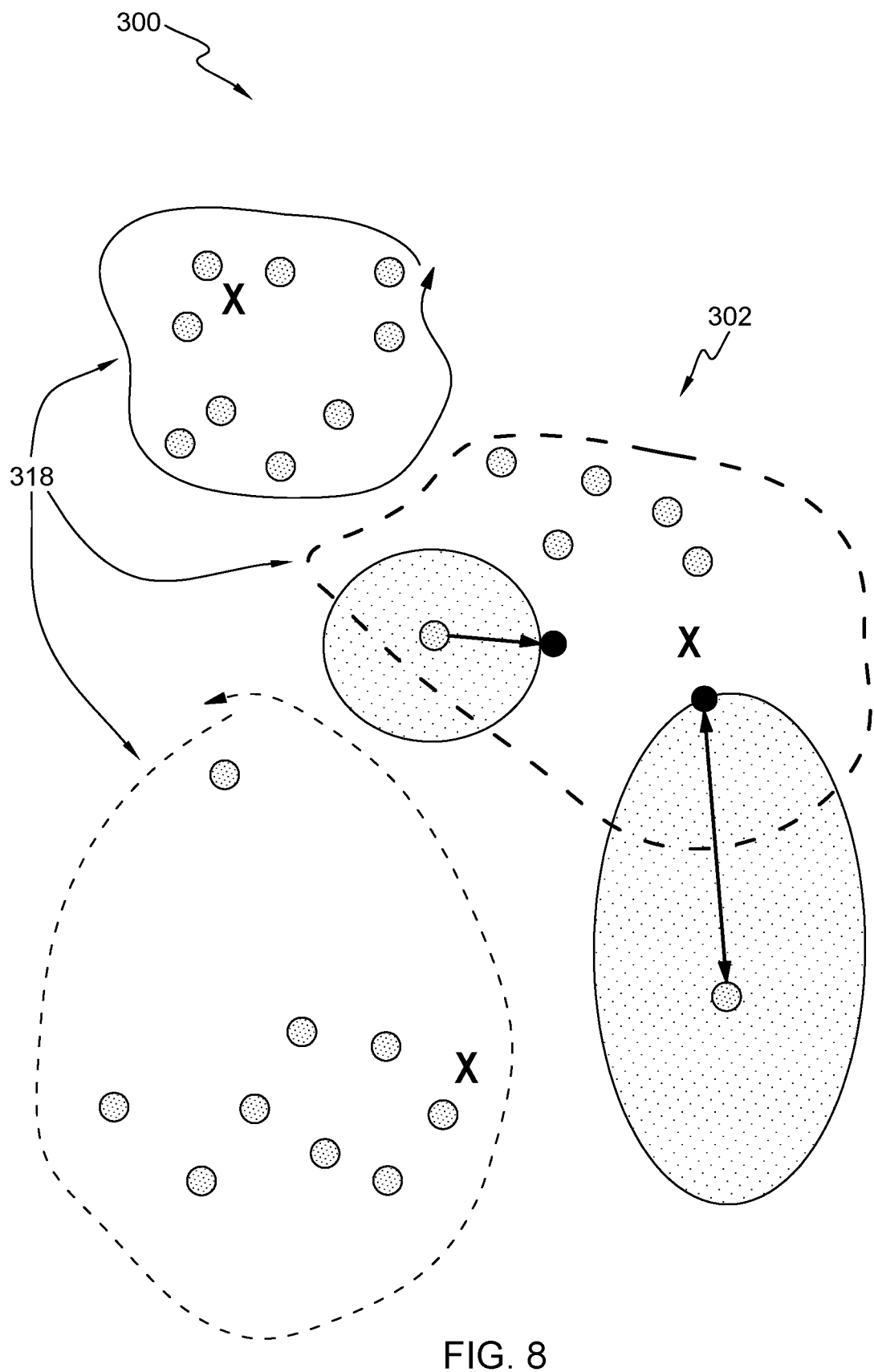

The clustering program 120 may also assign the data points to clusters based on the effective distances rather than the Euclidian distances to the data points themselves (block 214). FIG. 8 depicts a two-dimensional representation of the data set 300 of FIG. 3 with modified clusters 318 assigned for representative recomputing points 314. The modified clusters 318 may have the data points 302 assigned based on the shorter effective distance 312 between the recomputing points 314 and the centroids 304.

Figure 9:
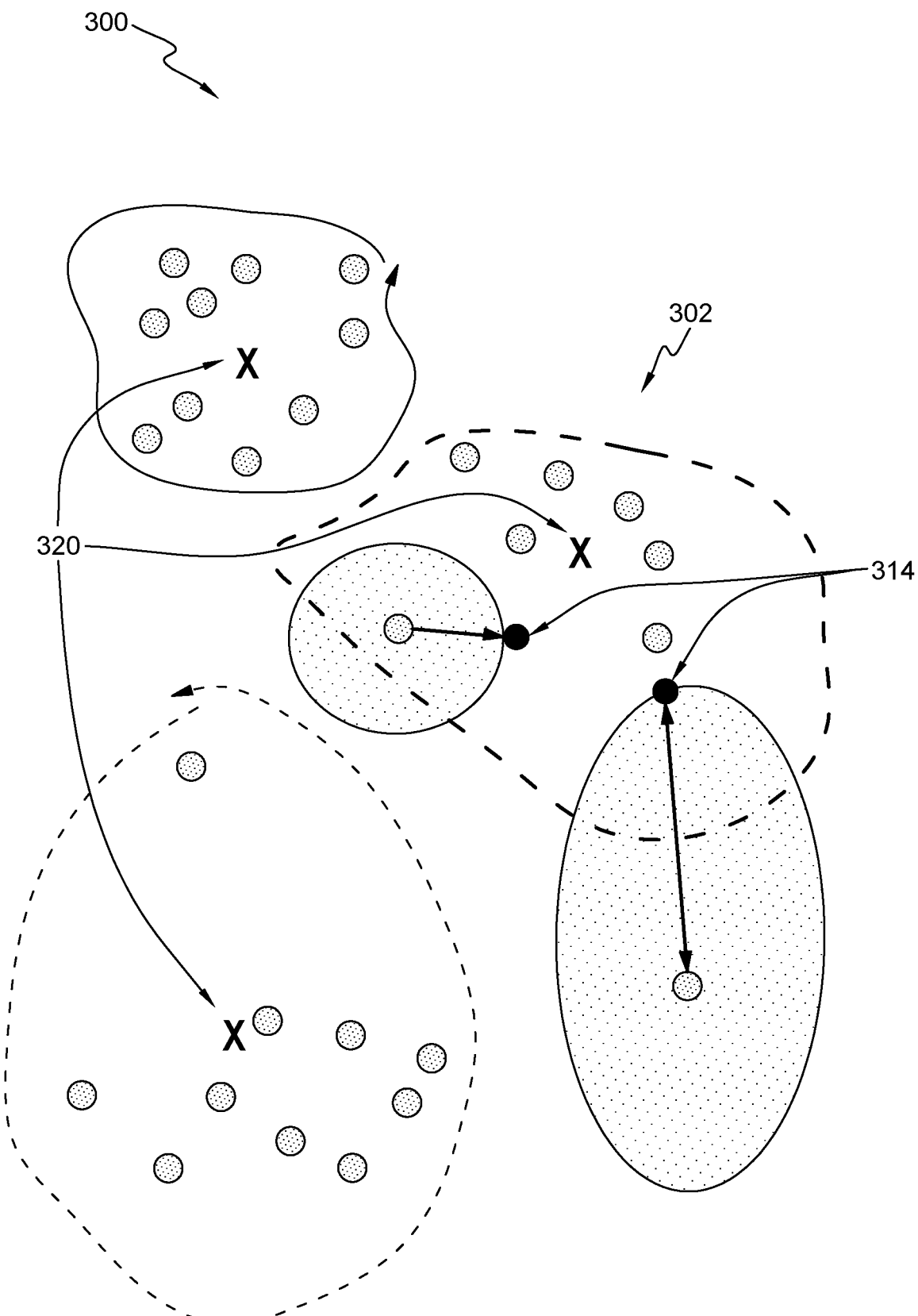

After the clusters or the modified clusters are assigned, the clustering program 120 may also recompute the centroids (block 216). FIG. 9 depicts a two-dimensional representation of the data set 300 of FIG. 3 with recomputed centroids 320, in accordance with one embodiment of the present invention. The recomputed centroids 320 are positioned at locations within the data set 300 that are the average values of the data points 302 within the modified clusters 318. For the recomputed centroids 320, the recomputing points 314 may be used rather than the data points 302 to average the location for those data points 302 that have distribution boundaries 310.

The clustering program 120 may also determine whether the centroids 304 or recomputed centroids 320 have moved (block 218). If at least one of the centroids 304 or recomputed centroids 320 have moved (block 218 "Yes"), then the clustering program 120 repeats the process from computing Euclidian distances (block 206). If none of the centroids 304 or recomputed centroids 320 have moved during the instant interation (block 218 "No"), then the clustering program 120 determines that the modified clusters 318 are well-suited to the data set 300, and the process ends. Other metrics may be used to end the process as well. For example, the clustering program 120 may determine whether the recomputed centroids 320 have moved less than a predefined threshold of distance traveled from the previous location of the centroid. This predefined threshold shortens the run time of the clustering program 120, which balances the accuracy of the clustering program 120 with the resources used to finish the algorithm.

Figure 10:
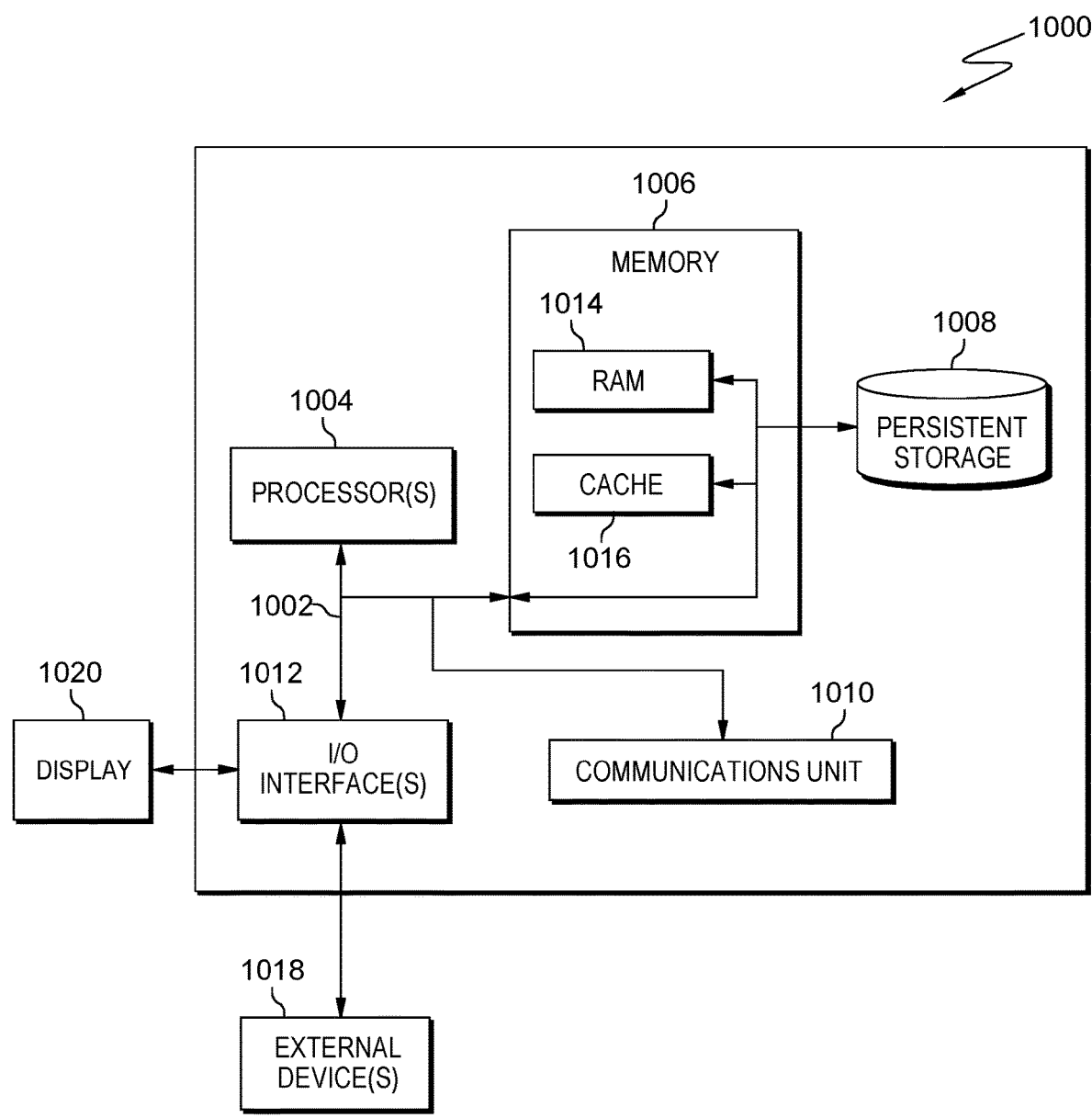
FIG. 10 depicts a block diagram of components of a computing device in accordance with an illustrative embodiment of the present invention.

FIG. 10 depicts a block diagram of components of a computing device 1000 in accordance with an illustrative embodiment of the present invention. As described above, the computing device 1000 may represent any of the devices (e.g., server computer 104) described above, or a combination of the devices, in the embodiments where the devices are embodied as components of a single computing device 1000. It should be appreciated that FIG. 10 provides only an illustration of one implementation and does not imply any limitations with regard to the environments in which different embodiments may be implemented. Many modifications to the depicted environment may be made.

The computing device 1000 includes communications fabric 1002, which provides communications between RAM 1014, cache 1016, memory 1006, persistent storage 1008, communications unit 1010, and input/output (I/O) interface (s) 1012. Communications fabric 1002 can be implemented with any architecture designed for passing data and/or control information between processors (such as microprocessors, communications and network processors, etc.), system memory, peripheral devices, and any other hardware components within a system. For example, communications fabric 1002 can be implemented with one or more buses or a crossbar switch.

Memory 1006 and persistent storage 1008 are computer readable storage media. In this embodiment, memory 1006 includes random access memory (RAM). In general, memory 1006 can include any suitable volatile or non-volatile computer readable storage media. Cache 1016 is a fast memory that enhances the performance of computer processor(s) 1004 by holding recently accessed data, and data near accessed data, from memory 1006.

The software components (e.g., clustering program 120) may be stored in persistent storage 1008 and in memory 1006 for execution and/or access by one or more of the respective computer processors 1004 via cache 1016. In an embodiment, persistent storage 1008 includes a magnetic hard disk drive. Alternatively, or in addition to a magnetic hard disk drive, persistent storage 1008 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 1008 may also be removable. For example, a removable hard drive may be used for persistent storage 1008. Other examples include optical and magnetic disks, thumb drives, and smart cards that are inserted into a drive for transfer onto another computer readable storage medium that is also part of persistent storage 1008.

Communications unit 1010, in these examples, provides for communications with other data processing systems or devices. In these examples, communications unit 1010 includes one or more network interface cards. Communications unit 1010 may provide communications through the use of either or both physical and wireless communications links. The proxy, application, access manager, collection page, authentication tool, or multi-factor authentication page may be downloaded to persistent storage 1008 through communications unit 1010.

I/O interface(s) 1012 allows for input and output of data with other devices that may be connected to the computing device 1000. For example, I/O interface 1012 may provide a connection to external devices 1018 such as a keyboard, keypad, a touch screen, and/or some other suitable input device. External devices 1018 can also include portable computer readable storage media such as, for example, thumb drives, portable optical or magnetic disks, and memory cards. Software and data used to practice embodiments of the present invention (e.g., rule generating program 130) can be stored on such portable computer readable storage media and can be loaded onto persistent storage 1008 via I/O interface(s) 1012. I/O interface(s) 1012 also connect to a display 1020.

Display 1020 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for improving a k-means clustering algorithm, comprising:
   assigning, by one or more processors, all data points within a data set to one of a set of clusters, wherein a first data point is assigned to a first cluster comprising multiple of the data points, and the data points are stored on a corpus configured to store a data stream, physical local clock buffers (LCBs), sets of training data, data structures, and variables used to fit parameters of a specified model;
   calculating calculated values other than the first data point that satisfy conditions for clustering the first data point with the first cluster and excluding values that satisfy conditions for clustering the first data point to another cluster of the set of clusters;
   modifying, by one or more processors, the first data point to include a first distribution boundary, wherein the first distribution boundary comprises a space of the calculated values determined by current operation of the LCBs, wherein the first distribution boundary represents a physical characteristic;
   calculating, by one or more processors, a first effective distance between the first distribution boundary and a first centroid of the first cluster;
   generating, by one or more processors, a first recompute point at the first effective distance; and
   recomputing, by one or more processors, the first centroid based on the first recompute point.

2. The method of claim 1, comprising initializing the first centroid to a data point of the data set and computing a Euclidian distance between the first centroid and each data point.

3. The method of claim 1, wherein the first distribution boundary comprises a selection from the group consisting of: a spherical distribution boundary, a cluster capacity, and a gaussian distribution boundary.

4. The method of claim 1, wherein the effective distance comprises a shortest distance between the first centroid and the first distribution boundary.

5. The method of claim 1, wherein recomputing a location of the first centroid comprises averaging all other data points in the cluster with a recomputing point on the first distribution boundary.

6. The method of claim 1, comprising calculating a second effective distance between the first distribution boundary and a second centroid of a second cluster before assigning the first data point to the first cluster, wherein the first effective distance is shorter than the second effective distance.

7. The method of claim 1, wherein the first distribution boundary comprises a representation of a timing slack and a device-specific metric.

8. The method of claim 1, wherein the first distribution boundary comprises a representation of geographical preferences, wherein the geographical preferences comprise directional constraints based on physical blockages.

9. A computer program product for improving a k-means clustering algorithm, comprising:
   one or more computer readable storage media, and program instructions collectively stored on the one or more computer readable storage media, the program instructions comprising:
   program instructions to assign all data points within a data set to one of a set of clusters, wherein a first data point is assigned to a first cluster comprising multiple data points, and the data points are stored on a corpus configured to store a data stream, physical local clock buffers (LCBs), sets of training data, data structures, and variables used to fit parameters of a specified model;
   program instructions to calculate calculated values other than the first data point that satisfy conditions for clustering the first data point with the first cluster and excluding values that satisfy conditions for clustering the first data point to another cluster of the set of clusters;
   program instructions to modify the first data point to include a first distribution boundary, wherein the first distribution boundary comprises a space of the calculated values determined by current operation of the LCBs, wherein the first distribution boundary represents a physical characteristic;
   program instructions to calculate a first effective distance between the first distribution boundary and a first centroid of the first cluster;
   program instructions to generate a first recompute point at the first effective distance; and
   program instructions to recompute the first centroid based on the first recompute point.

10. The computer program product of claim 9, comprising program instructions to initialize the first centroid to a data point of the data set and computing a Euclidian distance between the first centroid and each data point.

11. The computer program product of claim 9, wherein the first distribution boundary comprises a selection from the group consisting of: a spherical distribution boundary, a cluster capacity, and a gaussian distribution boundary.

12. The computer program product of claim 9, wherein the effective distance comprises a shortest distance between the first centroid and the first distribution boundary.

13. The computer program product of claim 9, wherein recomputing a location of the first centroid comprises averaging all other data points in the cluster with a recomputing point on the first distribution boundary.

14. The computer program product of claim 9, comprising program instructions to calculate a second effective distance between the first distribution boundary and a second centroid of a second cluster before assigning the first data point to the first cluster, wherein the first effective distance is shorter than the second effective distance.

15. A computer system for improving a k-means clustering algorithm, comprising:
   one or more computer processors, one or more computer readable storage media, and program instructions collectively stored on the one or more computer readable storage media for execution by at least one of the one or more computer processors, the program instructions comprising:
      program instructions to assign all data points within a data set to one of a set of clusters, wherein a first data point is assigned to a first cluster comprising multiple data points, and the data points are stored on a corpus configured to store a data stream, physical local clock buffers (LCBs), sets of training data, data structures, and variables used to fit parameters of a specified model;
      program instructions to calculate calculated values other than the first data point that satisfy conditions for clustering the first data point with the first cluster and excluding values that satisfy conditions for clustering the first data point to another cluster of the set of clusters;
      program instructions to modify the first data point to include a first distribution boundary, wherein the first distribution boundary comprises a space of the calculated values determined by current operation of the LCBs, wherein the first distribution boundary represents a physical characteristic;
      program instructions to calculate a first effective distance between the first distribution boundary and a first centroid of the first cluster;
      program instructions to generate a first recompute point at the first effective distance; and
      program instructions to recompute the first centroid based on the first recompute point.

16. The computer system of claim 15, comprising program instructions to initialize the first centroid to a data point of the data set and computing a Euclidian distance between the first centroid and each data point.

17. The computer system of claim 15, wherein the first distribution boundary comprises a selection from the group consisting of: a spherical distribution boundary, a cluster capacity, and a gaussian distribution boundary.

18. The computer system of claim 15, wherein the effective distance comprises a shortest distance between the first centroid and the first distribution boundary.

19. The computer system of claim 15, wherein recomputing a location of the first centroid comprises averaging all other data points in the cluster with a recomputing point on the first distribution boundary.

20. The computer system of claim 15, comprising program instructions to calculate a second effective distance between the first distribution boundary and a second centroid of a second cluster before assigning the first data point to the first cluster, wherein the first effective distance is shorter than the second effective distance.

* * * * *